US008972533B1

(12) United States Patent
Roka

(10) Patent No.: US 8,972,533 B1
(45) Date of Patent: Mar. 3, 2015

(54) ACTIVATING TOUCH-SENSITIVE KEYS UTILIZING CONFIGURATION SETTINGS

(75) Inventor: Pujan K. Roka, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1828 days.

(21) Appl. No.: 11/936,793

(22) Filed: Nov. 8, 2007

(51) Int. Cl.
*G06F 15/16* (2006.01)
*H04L 29/08* (2006.01)
*H04N 5/44* (2011.01)

(52) U.S. Cl.
CPC ............ *H04L 67/125* (2013.01); *H04N 5/4403* (2013.01)
USPC ............................. 709/220; 709/221; 348/734

(58) Field of Classification Search
CPC .. H04N 21/47; H04N 5/44582; H04N 5/4403
USPC .......... 709/219, 230, 218, 220, 221; 348/734; 719/313; 84/645; 345/173, 168; 379/88.18; 455/185.1, 566, 457; 715/531, 744, 810, 513; 713/1
See application file for complete search history.

(56) References Cited

U.S. PATENT DOCUMENTS

| | | | |
|---|---|---|---|
| 4,882,582 A | 11/1989 | Oka | |
| 5,615,257 A | 3/1997 | Pezzullo | |
| 5,854,624 A | 12/1998 | Grant | |
| 5,999,595 A * | 12/1999 | Shaffer et al. | 379/88.18 |
| 6,104,334 A * | 8/2000 | Allport | 341/175 |
| 6,127,941 A * | 10/2000 | Van Ryzin | 340/4.37 |
| 6,346,934 B1 | 2/2002 | Wugofski | |
| 6,437,836 B1 * | 8/2002 | Huang et al. | 348/734 |
| 6,597,345 B2 | 7/2003 | Hirshberg | |
| 6,788,241 B2 * | 9/2004 | Arling et al. | 341/176 |
| 6,989,763 B2 * | 1/2006 | Wall et al. | 340/12.25 |
| 7,093,003 B2 * | 8/2006 | Yuh et al. | 709/219 |
| 7,230,563 B2 * | 6/2007 | Vidal | 341/176 |
| 7,707,514 B2 * | 4/2010 | Forstall et al. | 715/810 |
| 7,831,930 B2 * | 11/2010 | Dresti et al. | 715/835 |
| 7,895,532 B2 * | 2/2011 | Scott et al. | 715/810 |
| 2003/0154446 A1 * | 8/2003 | Constant et al. | 715/531 |
| 2003/0182626 A1 * | 9/2003 | Davidov et al. | 715/513 |
| 2005/0021935 A1 * | 1/2005 | Schillings et al. | 713/1 |
| 2005/0188056 A1 * | 8/2005 | Kangas et al. | 709/218 |
| 2005/0197141 A1 * | 9/2005 | Jiang et al. | 455/457 |
| 2006/0168282 A1 * | 7/2006 | Turner et al. | 709/230 |
| 2006/0176278 A1 * | 8/2006 | Mathews et al. | 345/168 |
| 2007/0037534 A1 * | 2/2007 | Doudnikoff et al. | 455/185.1 |
| 2007/0199432 A1 * | 8/2007 | Abe et al. | 84/645 |
| 2008/0280651 A1 * | 11/2008 | Duarte | 455/566 |

(Continued)

*Primary Examiner* — Aaron Strange

(57) ABSTRACT

One or more media for performing a method of activating a set of user-input elements (e.g., touch-sensitive keys) accommodated by a mobile device according to configuration settings is provided. Initially, a message sent from a transmitting device having a data file includes an address to identify the mobile device. Upon the identified mobile device sending a request to access the data file, a communications-network server performs a configuration-preparation process that includes the following steps: retrieving the appropriate data file, determining the capabilities of mobile device based on a user-agent profile, selecting configuration settings specific to the mobile device capabilities, and dynamically appending the configuration settings to the data file, which are then transmitted to the mobile device. Upon receipt, the mobile device applies the configuration settings to activate at least a portion of the user-input elements, where activation enables activated user-input element(s) to trigger a command on the mobile device.

19 Claims, 8 Drawing Sheets

(56) References Cited

U.S. PATENT DOCUMENTS

2008/0303796 A1* 12/2008 Fyke ............................ 345/173
2008/0307315 A1* 12/2008 Sherman et al. ............. 715/744
2009/0088216 A1* 4/2009 Pichler et al. ................. 455/566
2009/0119678 A1* 5/2009 Shih et al. .................... 719/313
2009/0140992 A1* 6/2009 Tolaio .......................... 345/173
2012/0033140 A1* 2/2012 Xu ............................... 348/734

* cited by examiner

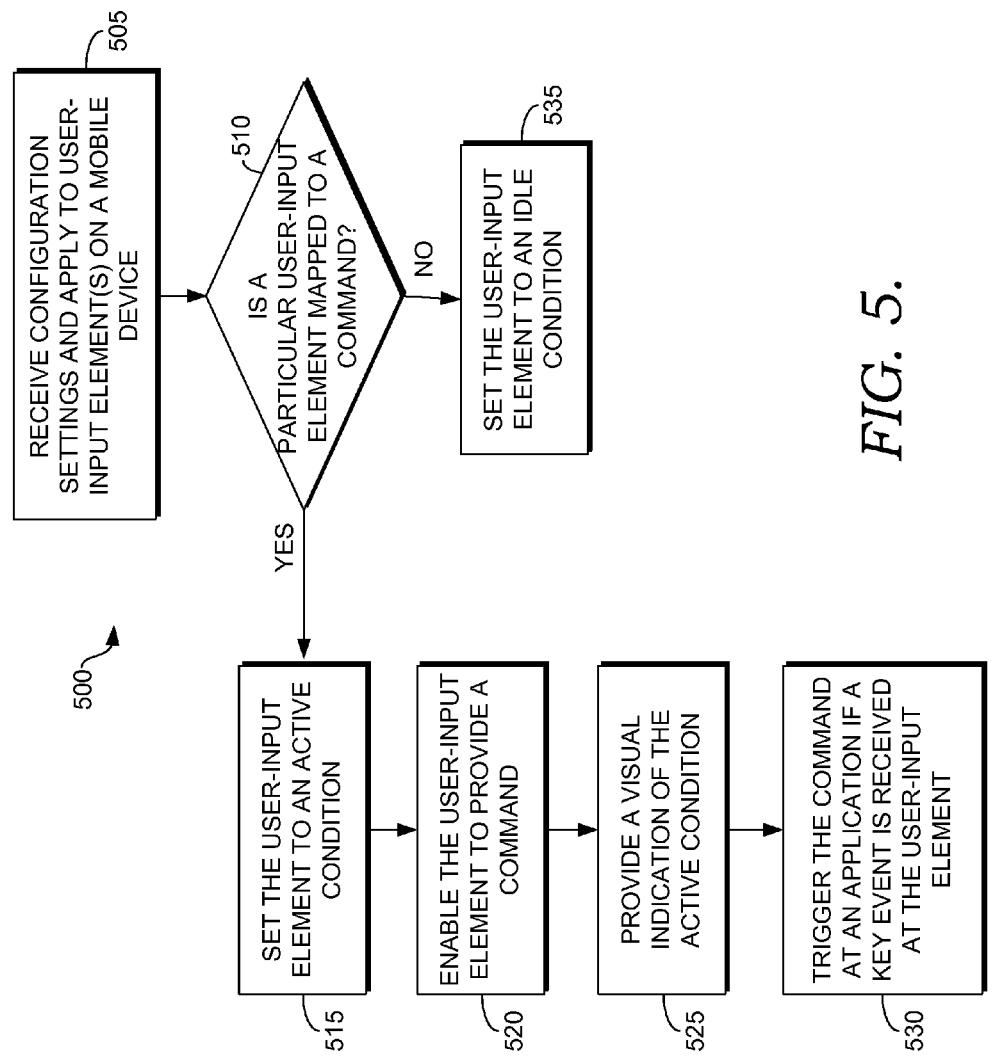

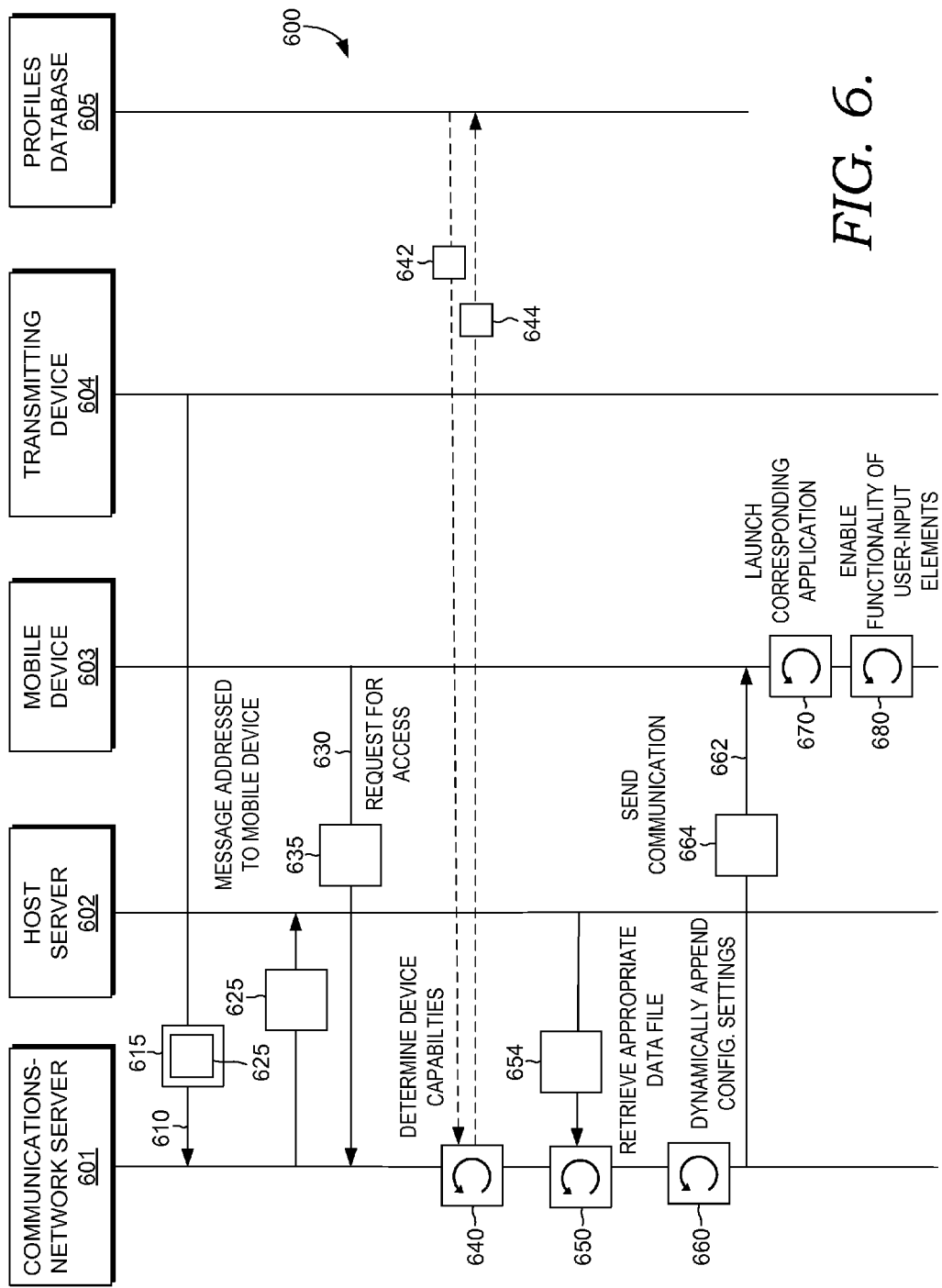

```
Content-Name: Sample Application
Content-Version: 2.0.23
Content-Vendor: Sprint
Content-Jar-URL: Application_Name.JAR
Content-Jar-Size: 62867
Content-Description: This is a sample application.
Content-Data-Size: 151552
Content-Permissions: LIST_OF_APIs
Complete-Description: Update Complete!
Complete-Launch-Label: Launch Application
Complete-Web-Label: Power Vision
Content-Delete-Lock: Yes
Content-Folder: Embedded
Content-ID: ondemand/config
DRM: true
MicroEdition-Configuration: CLDC-1.1
MicroEdition-Profile: MIDP-2.0
Content-Jar-RSA-SHA1: SIGNATURE_KEY
Key-Filter: Left, Right, Top, Bottom
```

JAD FILE 900

FIG. 9.

ACTIVATING TOUCH-SENSITIVE KEYS UTILIZING CONFIGURATION SETTINGS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

The present invention relates generally to field of mobile devices, and more particularly to mobile devices that can manipulate content being presented on a user-interface display via activated user-input elements.

Mobile devices, including personal digital assistants (PDAs), handsets, and other computing devices, often rely on keys located on the surface of the device to receive user-initiated inputs. Typically an input is made by selecting a single-purpose key that is effective for a specific operation, regardless of the application being presently implemented. Although these single-purpose keys (e.g., directional keys, and "enter" key) are adapted to perform their respective specific operations on many applications, there are increasingly more varieties of applications that may be executed on a mobile device. These disparate applications perform operations that are often triggered by uncommon types of inputs (e.g., rotate image, collapse window, etc.). Accordingly, the limited surface area available on a mobile device to house single-purpose keys would be required to grow exponentially to accommodate these inputs of the various applications. However, mobile devices having large space consumption, in many cases, are not practical in the compact mobile environment. Additionally, new applications having different operations than those supported by a mobile device presently in the market would create frustration to those who presently own a mobile device and to those companies creating new applications.

Further, offering a single-purpose key to provide a wide range of inputs is not intuitive to users manipulating content on a user-interface display. For instance, scrolling vertically through a document using left and right directional keys hinders a user from easily detecting the proper single-purpose keys to depress, and creates a disconnect between the key layout of the mobile device and the functionality of an application. Accordingly, a multifunction set of keys that can adapt to a variety of applications, and can be continually updated, would provide a robust method of facilitating user control over the functionality of a plurality of applications.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The present invention is defined by the claims.

Embodiments of the invention have several practical applications in the technical arts, including providing a mobile device having user-input elements (e.g., touch-sensitive keys) for, among other things, facilitating user control over an application presently running on the device. Initially, a message sent from a transmitting device to the mobile device will include a data file within the message. Upon the mobile device sending a request to access the data file, a communications-network server performs a configuration-preparation process. The configuration-preparation process includes at least the following steps: retrieving the appropriate data file, determining the capabilities of the mobile device (e.g., based on a user-agent profile), selecting configuration settings specific to the mobile device capabilities, and dynamically appending the configuration settings to the data file, which are consequently transmitted to the mobile device. Upon receipt, the mobile device may open the data file with an appropriate application. Additionally, the mobile device may apply the configuration settings to, or activate, one or more functional keys of the touch-sensitive keys such that a user-initiated key event at a functional key triggers a command at the application. In one instance, the activation of one or more functional keys is indicated to a user.

Embodiments generally relate to performing a method of activating a set of user-input elements according to configuration settings. More particularly, a first aspect of an embodiment is directed to a mobile device receiving a user-initiated request to access a data file. Initially, the mobile device retrieves the data file from a communications-network server. Typically, the data file has configuration settings appended thereto. The mobile device launches an application configured to execute the data file, where the application has a plurality of commands associated therewith. Additionally, the mobile device automatically activates user-input element(s) according to the configuration settings, where each command of the plurality of commands corresponds to the activated user-input element(s). A visual indication is provided to help a user recognize the activated user-input element(s).

In a second aspect, embodiments are directed toward a computer system for activating one or more user-input elements according to configuration settings. Initially, a communications-network server is provided for storing a data file. Also, a mobile device is provided for retrieving the data file from the communications-network server, where the data file has configuration settings appended thereto. Additionally, the mobile device is provided for launching an application configured to execute the data file, where the application has a plurality of commands associated therewith. The mobile device includes user-input elements and a user-interface display. The user-input elements are automatically activated according to the configuration settings, where each command of the plurality of commands corresponds to the activated user-input element(s). Typically, the activated user-input element(s) provide a visual indication. The user-interface display is provided for rendering a representation of the data file.

A further aspect of an embodiment takes the form of a mobile device. The mobile device includes touch-sensitive key(s), a transmission component, and an execution component. The touch-sensitive keys are provided for receiving an input from a user to access a document. The transmission component is provided for retrieving the document from a communications-network server, where the document has configuration settings appended thereto. The execution component is provided for launching an application configured to open the document and apply the configuration settings to the touch-sensitive key(s), where applying includes automatically activating, according to the configuration settings, at least one functional key of the touch-sensitive key(s). Typically, at least one functional key visually indicates an active condition to the user. Alternatively, each of one or more touch-sensitive key not automatically activated reside in an idle condition.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein:

FIG. 5 is a flow diagram showing a method for enabling a user-input element based on configuration settings received at the mobile device, in accordance with an embodiment of the present invention;

FIG. 6 is a diagrammatic chart showing a method for activating one or more user-input elements according to configuration settings, in accordance with an embodiment of the present invention;

FIG. 9 is a exemplary depiction of a Java Application Descriptor (JAD) file suitable for use in implementing embodiments of the present invention.

DETAILED DESCRIPTION

Figure 1:
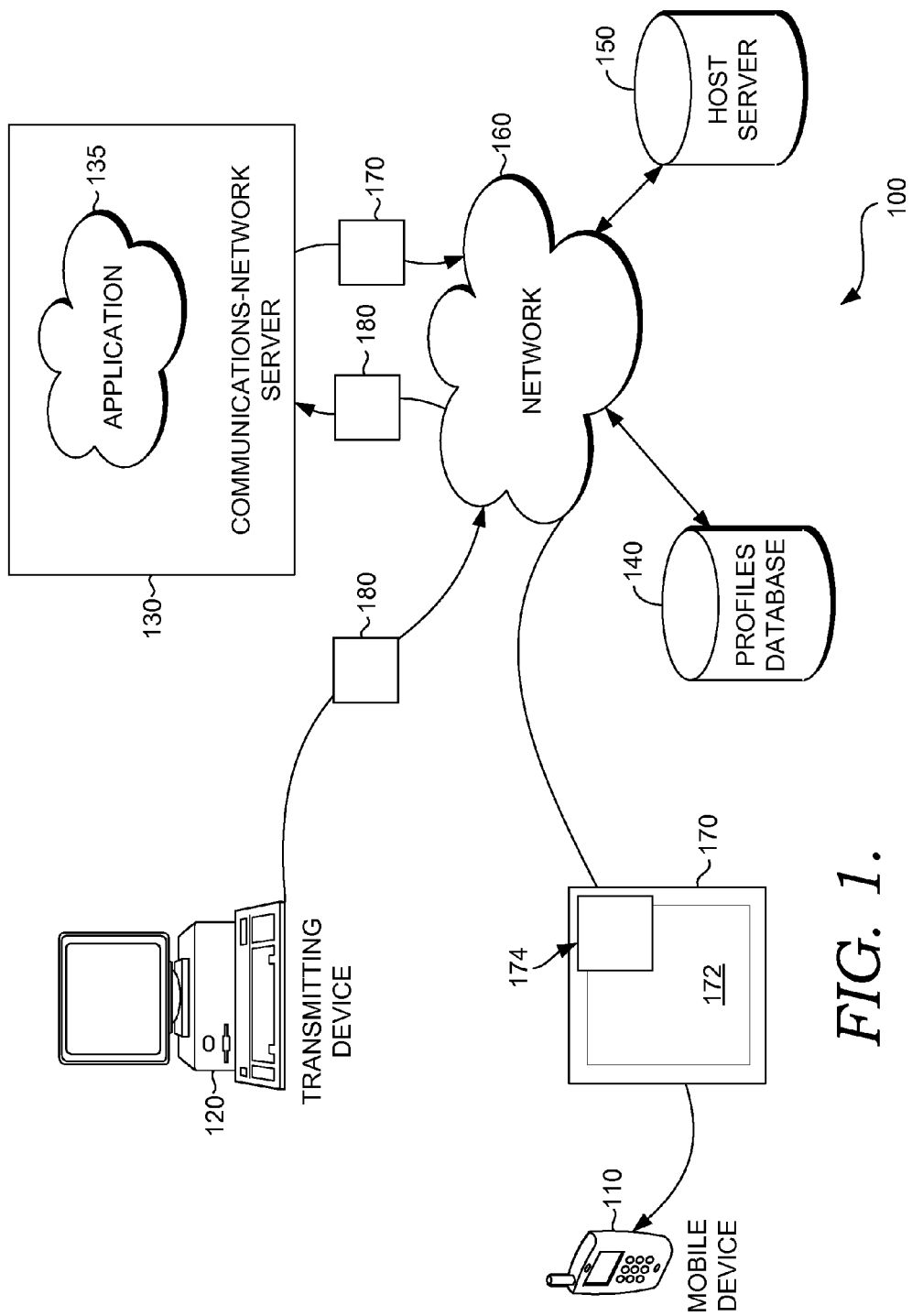
FIG. 1 is a schematic diagram of an exemplary system architecture suitable for use in implementing embodiments of the present invention.

Embodiments provide systems and methods for activating a set of user-input elements according to configuration settings provided to a mobile device. These configuration settings are provided by a communications-network server upon the server performing a configuration-preparation process. The configuration-preparation process includes at least the following steps: determining the capabilities of the mobile device (e.g., based on a user-agent profile), selecting configuration settings specific to the mobile device capabilities, and dynamically attaching the configuration settings to a data file, which are then transmitted to the mobile device. Upon receipt, the mobile device applies the configuration settings to, or activates, one or more user-input elements. The position of the activated user-input elements typically corresponds with a representation of a presently-running application implemented on the mobile device. Accordingly, an intuitive layout of active user-input elements is provided that facilitates ease of control over a broad range of various applications. Additionally, the user is alerted to the activated user-input elements upon perceiving a visual indication therefrom.

Acronyms and Shorthand Notations

Throughout the description, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

JAD Java Application Descriptor
JAR Java Archive
PDA Personal Digital Assistant
XML Extensible Markup Language Further, various technical terms are used throughout this description. A definition of such terms can be found in *Newtons Telecom Dictionary* by H. Newton, $22^{nd}$ Edition (2006). These definitions are intended to provide a clearer understanding of the ideas disclosed herein but are not intended to limit the scope of the present invention. The definitions and terms should be interpreted broadly and liberally to the extent allowed the meaning of the words offered in the above-cited reference.

As one skilled in the art will appreciate that embodiments may be embodied as, among other things, a computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and non-volatile media, removable and nonremovable media, and contemplates media readable by a database, a switch, and various other network devices. By way of example, computer-readable media comprise media implemented in any method or technology for storing information. Examples of stored information include computer-useable instructions, data structures, program modules, and other data representations. Media examples include information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Methods and systems are provided for activating a set of user-input elements on a mobile device. In exemplary embodiments, "user-input elements" are components accommodated by the mobile device that are configured to receive inputs from a user. In one embodiment, the user-input elements are touch-sensitive keys for receiving an input (e.g., key event) that is consequently conveyed to a presently-running application on the mobile device. In one instance, the "key event" triggers a particular command associated with the presently-running application according to the configuration setting of the selected touch-sensitive key. In one embodiment, at least a portion of the touch-sensitive keys have sensing devices operably coupled thereto for detecting a user selection (e.g., hardkeys that are activated by physical contact). In another embodiment, the touch-sensitive keys are built into the mobile device which provide a touch sensitive surface. In yet another embodiment, the touch-sensitive keys are multifunctional, where the function that each key initiates is updatable and is defined by the presently-running application.

Typically, the touch-sensitive keys are arranged in a pattern adjacent to a user-interface display such that a position of those keys that are activated (discussed below) correspond to a region of a representation on the user-interface display. In another instance, the activated keys are positioned logically according to user-expected operations (e.g., touch-sensitive keys are located in vertical alignment for scrolling operations). These types of configurations allow a user to quickly and intuitively select a function associated with an application being implemented at the mobile device.

In an exemplary embodiment, the touch-sensitive keys are configured to produce an indication to alert a user of being in an active condition. Alternatively, other touch-sensitive keys that are not activated, or in an idle condition, are not as noticeable to a user. That is, the indication emphasizes the active touch-sensitive keys while suppressing the presence of those in idle condition. The indication may be any method of calling attention to the activated touch-sensitive keys understood or appreciated by those of skill in the telecommunications industry. For instance, the indication may be one or more of the following: illumination or other visual indication, sound emission, or vibration feedback.

In another embodiment, the user-input elements are audio-receiving devices. In one instance, the audio-receiving device are configured to detect verbal instructions from a user. These instructions may be processed to generate input commands that affect a presently-running application on the mobile device. Although many examples are discussed above, other embodiments of the user-input elements contemplate any input-receiving device known or used by those having ordinary skill in the relevant field (e.g., continuous key pad).

Generally, some aspects of activating a set of user-input elements include receiving and processing configuration settings at the mobile device. As used herein, the phrase "configuration settings" is not meant to be limiting, but to encompass a broad scope of script that influences the operation and/or function triggered by the user-input element(s). In one embodiment, the configuration settings include a mapping structure for assigning one or more commands associated with an application to the user-input element(s). By way of example only, the mapping structure is derived according to capabilities or available user-input elements, of the mobile device, and a manifest of user-initiated commands associated with an application.

In embodiments, the configuration settings are transmitted to the mobile device as a communication from a communications-network server via a network path. The communication may transport the configuration settings in various formats, such as a Java applet, a Java Application Descriptor (JAD) file, a settings file, or any other suitable method for conveying script via wireless communication. As more fully discussed below with reference to FIG. 9, the JAD file is dynamically selected at the communications-network server based on the capabilities of each mobile device targeted for the communication thereby providing configuration settings that filter device-specific key events. As used herein, the term "filter" is not meant to be limiting, but encompass a range of methods for processing user inputs (e.g., key events, verbal instructions, etc.). In one embodiment, filtering includes converting user inputs into one or more commands associated with an application.

Referring to the drawings in general, and initially to FIG. 1 in particular, a schematic diagram of an exemplary system architecture suitable for use in implementing embodiments of the present invention is shown and designated generally as computing system 100. Illustrative computing system 100 includes, in one embodiment, a mobile device 110, a transmitting device 120, a communications-network server 130, a profiles database 140, and a host server 150 all in communication with one another via a network 160 (which may actually be multiple networks). Although the various components of FIG. 1 are shown with lines for the sake of clarity, in reality, delineating various components is not so clear, and metaphorically, the lines would more accurately be grey or fuzzy.

Further, although some components of FIG. 1 are depicted as single blocks, the depictions are exemplary in nature and in number and are not to be construed as limiting (e.g., although only one mobile device 110 is shown, many more may be operably coupled to network 160). Network 160 couples components 110, 120, 130, 140, and 150 (wired, wirelessly, or a combination thereof).

The mobile device 110 is configured to receive a communication, discussed more fully above, from the network 170. In addition, mobile device 110 may be any type of device having communications capability. Mobile device 110 may be, or variously referred to as, a handheld device, mobile handset, consumer electronics device, cell phone, personal digital assistant (PDA) unit, and the like. In addition, each mobile device 110 is typically provisioned with the communications-network server. In one embodiment, provisioning, as more fully discussed below with reference to FIG. 6, establishes the capabilities of the mobile device 110 with the communications-network server 130. In one instance, the capabilities (e.g., equipped with configurable touch-sensitive keys) are stored as a listing of capabilities in a user-agent profile that corresponds to the mobile device 110. Additional features of the mobile device 110, including the user-input elements accommodated thereon, are discussed more fully below with reference to FIG. 2.

Each of the transmitting device 120, the communications-network server 130, the profiles database 140, and the host server 150, as shown in FIG. 1, may take the form of various types of computing devices. By way of example only, components 120, 130, 140, and 150 may be a personal computing device, handheld device, consumer electronic device, and the like. Additionally, the transmitting device 120 is configured to send a message 180 addressed to the mobile device 110. In embodiments, the message includes an attached data file (e.g., document) that may be consumed by the mobile device 110. As such, the transmitting device 120, although not illustrated as such, may take the form of a mobile handset, cell phone, PDA unit, and the like.

In embodiments, the profiles database 140 is configured to store information associated with the mobile device 110 and is searchable for such information. In one embodiment, a user-agent profile is generated, typically incident to provisioning the mobile device 110 with the communications-network server 130. Typically, the user-agent profile includes information associated with, or mapped to, the capabilities of the mobile device 110. In this embodiment, the capabilities may be stored as a listing of capabilities (e.g., in a lookup table) that indicates, for instance, whether the mobile device 110 accommodates user-input elements having functionality that may be redefined and/or activated upon downloading configuration settings. Typically, the user-agent profile, and information therein, is accessible to the communications-network server 130; however, it is contemplated that any of the components 110, 120, and 150 may have limited access to information residing within the profiles database 140.

In embodiments, the host server 150 is configured to store information associated with the message 180 transmitted by the transmitting device 120 and is searchable for such information. In one embodiment, the message includes an attached data file. This data file may be any document, application, or other form of data embedded in an arrangement well known to those or ordinary skill in the telecommunications industry. Therefore it is emphasized that the invention is not limited only to the embodiments of the data file above, but is embracing of a wide variety of formats for communicating information. Further, in embodiments, the host server 150, and information therein, is accessible to the communications-network server 130; however, it is contemplated that any of the components 110, 120, and 150 may have limited access to information residing within the profiles database 140.

In embodiments, the communications-network server 130 is a computing device, operably connected to the network 160, that is configured to perform a variety of functions. One of these functions includes performing a configuration-preparation process. Another of these functions includes communicating with the profiles database 140 (e.g., to access the user-agent profile) and the host server 150 (e.g., to retrieve the message 180 and/or attached data file(s)) via the network. In other embodiments, one or more of the profiles database 140 and the host server 150 may be incorporated within the communications-network server 130 or may be in direct communication therewith. Yet another of these functions may include transmitting a communication 170, as more fully discussed above, to the mobile device 110. In embodiments, where the capabilities of the mobile device 110 allow, the communication 170 includes a data file 172 having a configuration settings 174 appended thereto. As discussed above, configuration settings may be transmitted in a variety of formats (e.g., Java-applet embedded in a Java Application Descriptor (JAD) file). One or more of these functions may be carried out by an application 135.

The application 135 resides, at least in part, on the communications-network server 130 and may be particularly configured to execute the configuration-preparation process. As more fully discussed below with reference to FIG. 2, embodiments of the configuration-preparation process include one or more of retrieving the appropriate data file 172 from the host server 150, determining the capabilities of the mobile device 110 upon accessing the user-agent file residing on the profiles database 140, selecting configuration settings 174 specific to capabilities of the mobile device 110, and dynamically appending the configuration settings 174 to the data file 172, which are then transmitted in a communication 170 to the mobile device 110.

Figure 2:
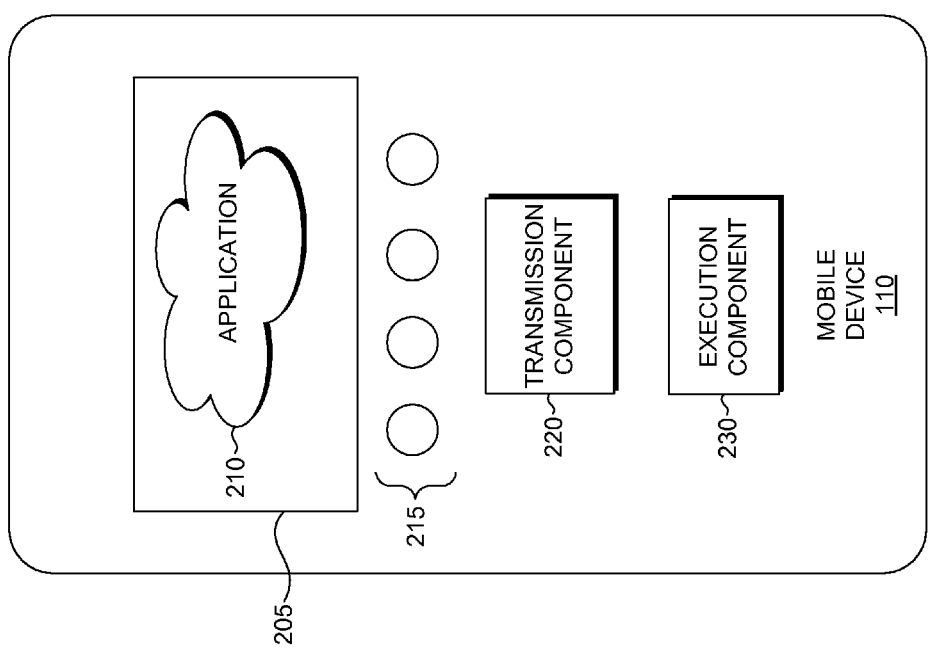
FIG. 2 is a schematic diagram depicting the components of an exemplary mobile device for use in implementing embodiments of the present invention.

Turning now to FIG. 2, a schematic diagram is shown that depicts the components of the exemplary mobile device 110 suitable for implementing embodiments of the present invention. In embodiments, the mobile device 110 includes a user-interface display 205, user-input elements 215, a transmission component 220, an execution component 230, and a presently-running application 210.

Typically, the user-interface display 205 is configured to render a representation of a data file. In one embodiment, the representation is presented incident to launching an application (e.g., the application 210) that is configured to execute the data file. In addition, the user interface 205 may be any presentation component (not shown) that is capable of presenting information to a user. In an exemplary embodiment, user interface 205 presents a representation that corresponds with the position of the user-input elements 215 to provide the user with intuitive control over the application 210.

The user-input elements 215, as more fully discussed above, provide an input (e.g., user-initiated request to access a data file) to the mobile device 110 incident to user selection. The input may vary based on the functionality assigned to each of the user-input elements 215, or the absence of functionality assigned thereto. In embodiments, the user-input elements 215 are adaptable to a functionality provided by the configuration settings; thus, extensible to providing inputs to a plurality of various applications (e.g., even applications that are not yet developed). These functions may be based on a manifest of commands associated with the application 210, where one or more of the commands are mapped to at least a portion of the user-input elements 215. Accordingly, the reconfigurable nature of the user-input elements 215 provides for a robust operating environment that is flexible to manipulating a variety of types of data files. By way of example, at least a portion of the user-input elements 215 are automatically activated according to the configuration settings, where each command of a plurality of commands associated with the application 210 corresponds to the activated user-input elements 215. Further, the activated user-input elements are configured to provide a visual indication alerting a user of their active condition.

The transmission component 220 is configured for retrieving a data file (e.g., document) from a communications-network server, typically via a communication transmitted through a network. As discussed above, the document may have configuration settings appended thereto, as determined by the communication-network server based on capabilities of mobile device 110. In addition, the transmission component 220 may be configured for sending a request to retrieve and/or access a particular data file, document, message, etc., from the communications-network server. In one instance, the request is in accordance with the user-initiated request provided as an input at the user-input elements 215.

The execution component 230 is configured for launching an application (e.g., application 210) and applying the configuration settings to the user-input elements 215. In one embodiment, an application is launched in response to a user-initiated input to access a data file provided at the user-input elements 215. Typically, the appropriate application for executing the selected data file is identified according to the data file type. This application, in embodiments, includes a plurality of commands associated therewith.

In embodiments, applying the configuration settings to the user-input elements 215 includes automatically activating, according to the configuration settings, at least one functional key of the user-input elements 215, where the functional key visually indicates an active condition to the user. In one instance, automatic activation is triggered upon launching an application. In this instance, each command associated with the application, which may be provided by a user, corresponds to the functional keys (e.g., activated user-input elements). In another instance, automatically activating comprises enabling the user-input elements 215 to provide at least one command to the application 210.

Figure 3:
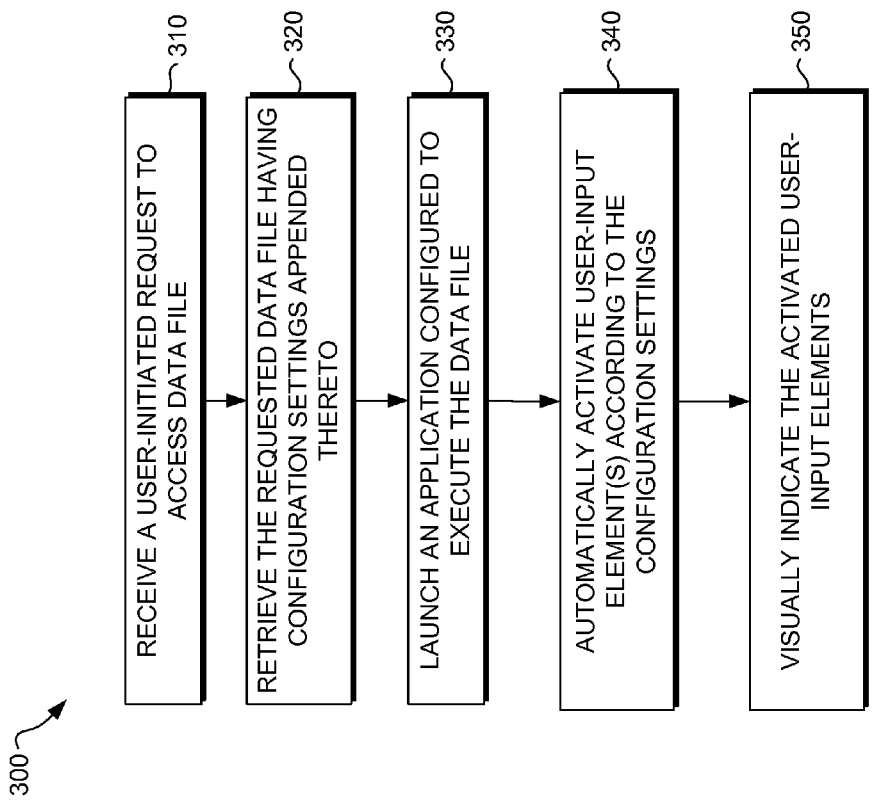
FIG. 3 is a flow diagram showing an overall method for activating a set of user-input element(s), in accordance with an embodiment of the present invention.

Turning now to FIG. 3, a flow diagram illustrating an overall method 300 for activating a set of user-input element(s) is shown, in accordance with an embodiment of the present invention. Initially, as indicated at block 310, a user-initiated request to access a data file is received at a mobile device (e.g., the mobile device 110 of FIG. 2). In one embodiment, the request is provided as an input at a touch-sensitive key (e.g., the user-input elements 215 of FIG. 2). Incident to receiving the request, as indicated at block 320, the requested data file, typically having configuration settings appended thereto, is retrieved from a communications-network server (e.g., the communications-network server 130 of FIG. 1). As depicted at block 330, an application configured to execute the data file is launched. As depicted in block 340, the user-input element(s) are automatically activated according to the configuration settings. In one instance, the steps of automatically activating the user-input elements and launching the application are performed concomitantly. As indicated at block 350, those user-input elements that are activated provide a visual indication to alert a user of their active condition.

Figure 4:
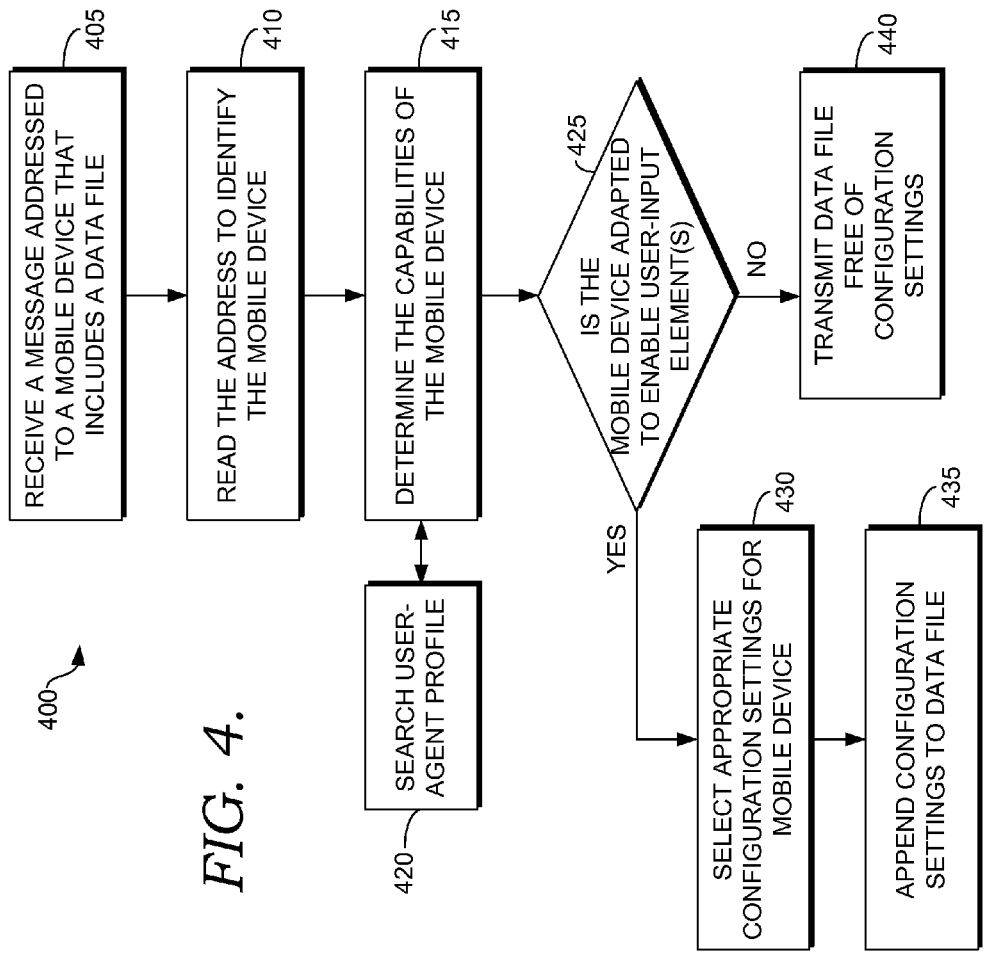
FIG. 4 is a flow diagram showing a method for performing a configuration-preparation process at a communications-network server, in accordance with an embodiment of the present invention.

Referring to FIG. 4, a flow diagram that illustrates a method 400 for performing a configuration-preparation process at a communications-network server is shown, in accordance with an embodiment of the present invention. Initially, as depicted at block 405, a message (e.g., the message 180 of FIG. 1) addressed to a mobile device is received at the mobile device. In some instances, the message includes a data file attached thereto. As depicted at block 410, the message is then read by a communications-network server to identify the mobile device (e.g., based on the address). In addition, attributes of the data file may be examined to determine which application would preferably execute the data file. The user-actuated commands associated with the application are then derived for later use in selecting the configuration settings. The address may be distributed to a profiles database (e.g., the profiles database 140 of FIG. 1) in order to search a user-agent profile residing thereon, as depicted at block 420. The results of the search assist in determining the capabilities of the mobile device, as indicated at block 415.

Next, a determination of whether the mobile device is adapted to enable user-input element(s) is performed, as indicated at block 425. That is, the determination identifies whether the mobile device has a key-filtering capability from a list of capabilities stored in its user-agent profile. If the determination indicates that the mobile device does not have key-filtering capabilities, the data file is transmitted to the device free of configuration settings, as indicated at block 440. If the determination indicates that the mobile device has key-filtering capabilities, the appropriate configuration settings are selected, as indicated at block 430. The selection is based on one or more of the following: mobile device capabilities, user-actuated commands of an application targeted by the data file, and availability of the configuration settings. These configuration settings (e.g., the configuration settings 174 of FIG. 1) are appended the data file (e.g., the data file 172 of FIG. 1) and transmitted in a communication (e.g., communication 170 of FIG. 1) to the mobile device. In one instance, the configuration files are dynamically appended to the data file. That is, the communications-network server appends the configuration settings to the data file in response to a request-to-open the data file received from a mobile device, thereby accommodating various types of mobile devices that are requesting access to the data file at different times.

Referring to FIG. 5, a flow diagram showing a method 500 for enabling a user-input element based on configuration settings received at the mobile device is provided, in accordance with an embodiment of the present invention. Initially, as indicated at block 505, configuration settings are received at a mobile device, typically appended to a data file. The mobile device may additionally apply the configuration settings to the user-input element(s). When applying the configuration settings, a determination of whether a particular user-input element is mapped to a command of an application suited to execute the data file is made, as indicated at block 510. In one instance, a mapping structure within the configuration settings assigns a command to one or more of the user-input elements. Accordingly, functionality of the application, within the device environment of the mobile device, may be extended to appropriate user-input elements thereby facilitating intuitive control over the application. If the particular user-input element is not mapped to a command, according to the mapping structure, then the user-input key is set to an idle condition, as indicated at block 535. In one instance, when in the idle condition, no functionality is afforded to the particular user-input element. In another instance, when in the idle condition, the particular user-input element does not alert the user to its presence, thereby hidden by default.

If the particular user-input element is mapped to a command, according to the mapping structure, then the user-input key is set to an active condition, as indicated at block 515. As more fully discussed above, when in active condition, the particular user-input element is enabled with functionality (see block 520), as dictated by the key-filtering capability of the device, and may provide a visual indication (e.g., via illumination) that it is functional and in an active condition (see block 525). As such, the functional keys are emphasized to alert a user to their presence on the surface of a mobile device. Thus, a command (e.g., as determined by the key-filtering capability) may be received at an application based on a key event transferred from a particular user-input element, as indicated at block 530.

Referring to FIG. 6, a diagrammatic chart illustrating a method 600 for activating one or more user-input elements according to configuration settings is shown, in accordance with an embodiment of the present invention. Initially, a transmitting device 604 (e.g., the transmitting device 120 of FIG. 2) sends a message 615 to a communications-network server 601. In one instance, the message 615 is sent via a network 610 (e.g., the network 160 of FIG. 1). In another instance, the message is addressed to a mobile device 603. Typically, the message 615 has a data file 625 attached thereto. The data file 625 may be stored at a host server 602, which is searchable to retrieve and/or access the data file 625.

A request 635 to access the data file 625 may be received from the mobile device 603. In one embodiment, the request 635 is a user-initiated request to access the data file 625. For instance, the user-initiated request may be a input at one or more user-input elements to open a document attached to an email message stored within a user's email account. Typically, the request 635 is transmitted via a network 630 to the communications-network server 601. In embodiments, upon receiving the request 635, the communications network server 601 begins performing a variety of functions, including the configuration-preparation process. As discussed above, embodiments of the configuration-preparation process include a procedure 640 for determining the capabilities of the mobile device 603 upon sending a capability request 642 to the user-agent file residing on a profiles database 605. In response, to the capability request 642, a list of device capabilities 644 (e.g., key-filtering capability) is returned to the communications-network server 601. The configuration-preparation process may also include a procedure 650 for retrieving the appropriate data file 654 from the host server 602. Further, the configuration-preparation process includes a procedure 660 for dynamically appending the configuration settings to the data file 654, wherein the configuration settings are selected for attachment based on a variety and/or combination of methods, as more fully discussed above.

In embodiments, in response to the request for access 635, a communication 664 is transmitted from the communications-network server 601. In one instance, the data file 625, and appended configuration settings, are embedded in the communication 664 being delivered via the network 662. In particular, the data file 625 may be delivered in a Java Archive (JAR) format, as an Extensible Mark-up Language (XML) file, or any other form known or used within the telecommunications industry. Incident to receiving the communication 664, the mobile device 603 performs a plurality of processes. In one embodiment, these processes include a procedure 670 to determine the application associated with the data file and launch the application thereby executing the data file 625 at the mobile device 603. In another embodiment, the processes include a procedure 680 for enabling functionality of at least a portion of the user-input elements, in accordance with the configuration settings.

Figure 7:
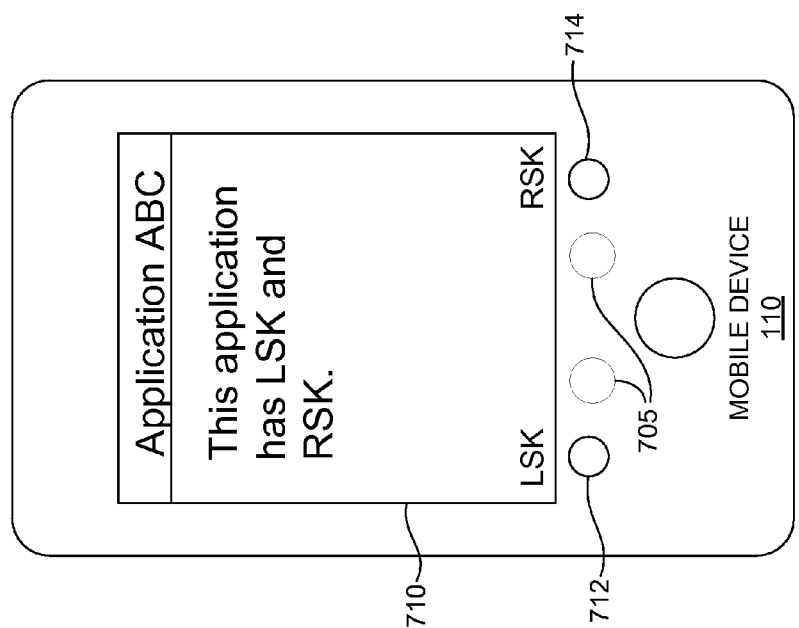
FIG. 7 is an exemplary set of user-input elements accommodated on a mobile device with functional keys in an active condition, in accordance with an embodiment of the present invention.

As shown in FIG. 7, an exemplary set of user-input elements 705, 712, and 714 accommodated by the mobile device 110, with functional keys 712 and 714 in an active condition, are provided, in accordance with an embodiment of the present invention. A representation of application ABC is presented on a user-interface display 710. In one embodiment, the functionality of the application ABC is responsible for activating the functional keys 712 and 714 by identifying those keys via the configuration file. In operation, a user-initiated selection, or touch, on either of the functional keys 712 and 714 generates a key event that is processed according to the key-filtering capabilities of the mobile device 110. Accordingly, these key events trigger an appropriate command at the application ABC. In this instance, the functional keys 712 and 714 relate to a left softkey and a right softkey respectively. By way of example, if the application ABC is a media player, the left softkey 712 may be mapped to trigger a "play" command, while right softkey 714 may be mapped to trigger a "stop" command, as interpreted by the application ABC. Further, the position of the functional keys 712 and 714 (in relation to the user-interface display 710) is intuitive to a user desiring to operate a media player, where "play" and "stop" are traditionally aligned horizontally.

Figure 8:
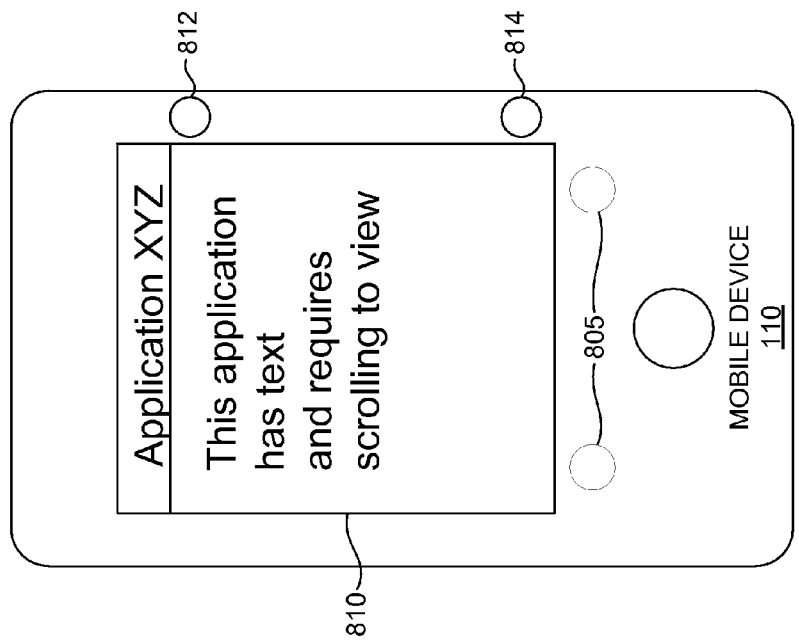
FIG. 8 is an exemplary set of user-input elements accommodated on a mobile device similar to the set of user-input elements of FIG. 7, but with different functional keys in active condition, in accordance with an embodiment of the present invention.

As shown in FIG. 8, an exemplary set of user-input elements 805, 812, and 814 accommodated by the mobile device 110, with functional keys 812 and 814 in an active condition, are provided, in accordance with an embodiment of the present invention. A representation of application XYZ is presented on a user-interface display 810. In one embodiment, the functionality of the application XYZ is responsible for activating the functional keys 812 and 814 by identifying those keys via the configuration file. In operation, a user-initiated selection, or touch, on either of the functional keys 812 and 814 generates a key event that is processed according to the key-filtering capabilities of the mobile device 110. Accordingly, these key events trigger an appropriate command at the application XYZ. In this instance, the functional keys 812 and 814 relate to a upper key and a lower key respectively. By way of example, if the application XYZ is a text document that does not fit within the user-interface display 810, the upper key 712 may be mapped to trigger a "scroll up" command, while lower key 714 may be mapped to trigger a "scroll down" command, as interpreted by the application XYZ. Further, the position of the functional keys 812 and 814 (in relation to the user-interface display 810) is intuitive to a user desiring to scroll through a document, where "scroll up" and "scroll down" are traditionally aligned vertically.

Further, with reference to FIGS. 7 and 8, functional keys 712, 714, 812, and 814 are emphasized to signify their active condition. Alternatively, user-input elements 705 and 805 are not activated, therefore in the idle condition. As such, user-input elements 705 and 805 are not emphasized, and perhaps, not noticeable to a user.

With reference to FIG. 9, an exemplary depiction of a Java Application Descriptor (JAD) file 900 suitable for use in implementing embodiments of the present invention is shown. Initially, the JAD file includes a set of attributes 905 related to the content of a communication transmitted from the communications-network server to the mobile device. One of the set of attributes 905 includes an identification of the application associated with an attached data file 920. Another of the set of attributes 905 includes a key-filter attribute 910, typically related to the key-filtering capability of the mobile device. As shown, the functionality of application requires "left," "right," "up," and "down" commands that are mapped to user-input elements via a mapping structure of the configuration settings.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more nontransitory computer-readable storage media having computer-useable instructions embodied thereon for performing a method of activating reconfigurable functional keys according to configuration settings, the method comprising:

receiving a user-initiated request to access a data file;

retrieving the data file via a communications-network server, wherein the data file is configured to be opened by an application that presents a representation of the data file on a display of the mobile device, wherein the application is associated with one or more commands, the data file having configuration settings attached thereto, wherein based on (a) a capability of the mobile device to reconfigure the reconfigurable functional keys and (b) the one or more commands associated with the application, the configuration settings map one or more of the reconfigurable functional keys to respective one or more of the commands associated with the application;

automatically assigning the one or more commands to the one or more reconfigurable functional keys, respectively, by way of the steps comprising:

(a) placing one or more of the functional keys in an active condition in accordance with the configuration settings;

(b) placing any unassigned reconfigurable functional keys in an idle condition in accordance with the configuration settings, wherein no functionality is afforded to reconfigurable functional keys in the idle condition; and (c) assigning the plurality of commands to the one or more functional keys in the active condition, respectively, in accordance with the configuration settings, wherein receiving a key event via a reconfigurable function key triggers a respective command; and visually indicating to a user of the mobile device the one or more functional keys are in the active condition.

2. The media of claim 1, wherein the one or more functional keys represent touch-sensitive keys.

3. The media of claim 1, wherein receiving a user-initiated request comprises receiving an indication to open a document attached to an email message.

4. The media of claim 3, wherein configuration settings are retrieved as a Java-applet embedded in a Java Application Descriptor (JAD) file.

5. The media of claim 1, wherein automatically assigning the one or more commands is based on a mapping structure included within the configuration settings, wherein the mapping structure is derived from both a position of the one or more reconfigurable function keys with respect to a user-interface display of the mobile device and functionality implemented by the launched application.

6. The media of claim 1, wherein the reconfigurable functional keys are arranged adjacent to the user interface display in a particular pattern, and wherein the U reconfigurable functional keys are assigned according to a mapping structure that is derived from a position of the reconfigurable functional keys in the active condition within the pattern adjacent to the user-interface display of the mobile device.

7. A computer system for activating one or more user-input elements according to configuration settings, comprising:
   a communications-network server configured for
      (a) storing a data file,
      (b) determining key-filtering capabilities of a mobile device requesting the data file, wherein the key-filtering capabilities include a capability to convert one or more key events received via reconfigurable user-input elements into commands associated with one or more applications, and
      (c) selecting configuration settings as a function of both the key-filtering capabilities of the mobile device and a plurality of commands that affect an application hosted at the mobile device, wherein the application is configured to execute the data file; and
   the mobile device configured for
      (a) retrieving the data file from the communications-network server, the data file having the selected configuration settings attached thereto, and
      (b) based on the selected configuration settings attached to the data file, automatically assigning the plurality of commands to the reconfigurable user-input elements upon launching the application configured to execute the data file.

8. The computer system of claim 7, wherein the communications-network server is further configured for receiving a message from a transmitting device, the message comprising the data file.

9. The computer system of claim 8, wherein the communications-network server is further configured for receiving a user-initiated request from the mobile device to access the data file.

10. The computer system of claim 9, wherein the communications-network server is further configured for dynamically attaching the configuration settings to the data file upon receiving the user-initiated request.

11. The computer system of claim 10, wherein communication-network server is further configured for reading an address from the message, the address directing the communications-network server to the user-agent profile.

12. The computer system of claim 7, wherein the key-filtering capabilities are established incident to the mobile device being provisioned with the communications-network server.

13. The computer system of claim 12, wherein the configuration settings include a mapping structure for mapping each command of the plurality of commands to the one or more functional keys in the active condition according to the configuration settings.

14. The computer system of claim 7, wherein the one or more functional keys in the active condition exhibit a visual indication of activity via illumination.

15. The computer system of claim 7, wherein the one or more functional keys in the active condition are configured for receiving a key event, the key event triggering a command, based on a user selection, of the plurality of commands, according to the configuration settings.

16. The computer system of claim 15, wherein the one or more functional keys in the active condition are operably coupled to sensing devices for detecting a user selection.

17. A mobile device comprising:
   a user-interface display for rendering a representation of a document;
   one or more reconfigurable user-input elements adjacent to the user-interface display for receiving an input from a user;
   a transmission component for retrieving the document from a communications-network server, the document having configuration settings attached thereto, wherein based on
      (a) the one or more reconfigurable user-input elements and
      (b) an application that is configured to execute the document,
   the configuration settings map the one or more reconfigurable user-input elements to respective one or more commands that affect the application that is configured to execute the document; and
   an execution component for launching the application that is affected by the one or more commands, wherein, during launching the application, the one or more commands are automatically assigned to the one or more reconfigurable user-input elements, respectively, by way of the steps comprising:
      (a) placing one or more functional keys of the one or more reconfigurable user-input elements in an active condition in accordance with the configuration settings;
      (b) assigning the one or more commands to the one or more functional keys in the active condition, respectively, in accordance with the configuration settings.

18. The mobile device of claim 17, wherein the at least one activated functional key visually indicates its condition of activation to the user.

19. The mobile device of claim 17, wherein the one or more reconfigurable user-input elements are arranged in a pattern adjacent to the user-interface display such that the position of the subject reconfigurable user-input element within the pattern adjacent to the user-interface display is intuitive against the representation of the opened document presented within the user-interface display.

\* \* \* \* \*